July 10, 1956 E. M. BUTLER 2,754,260
ELECTROLYTIC WATER CORRECTION DEVICE
Filed Oct. 22, 1952 2 Sheets-Sheet 2
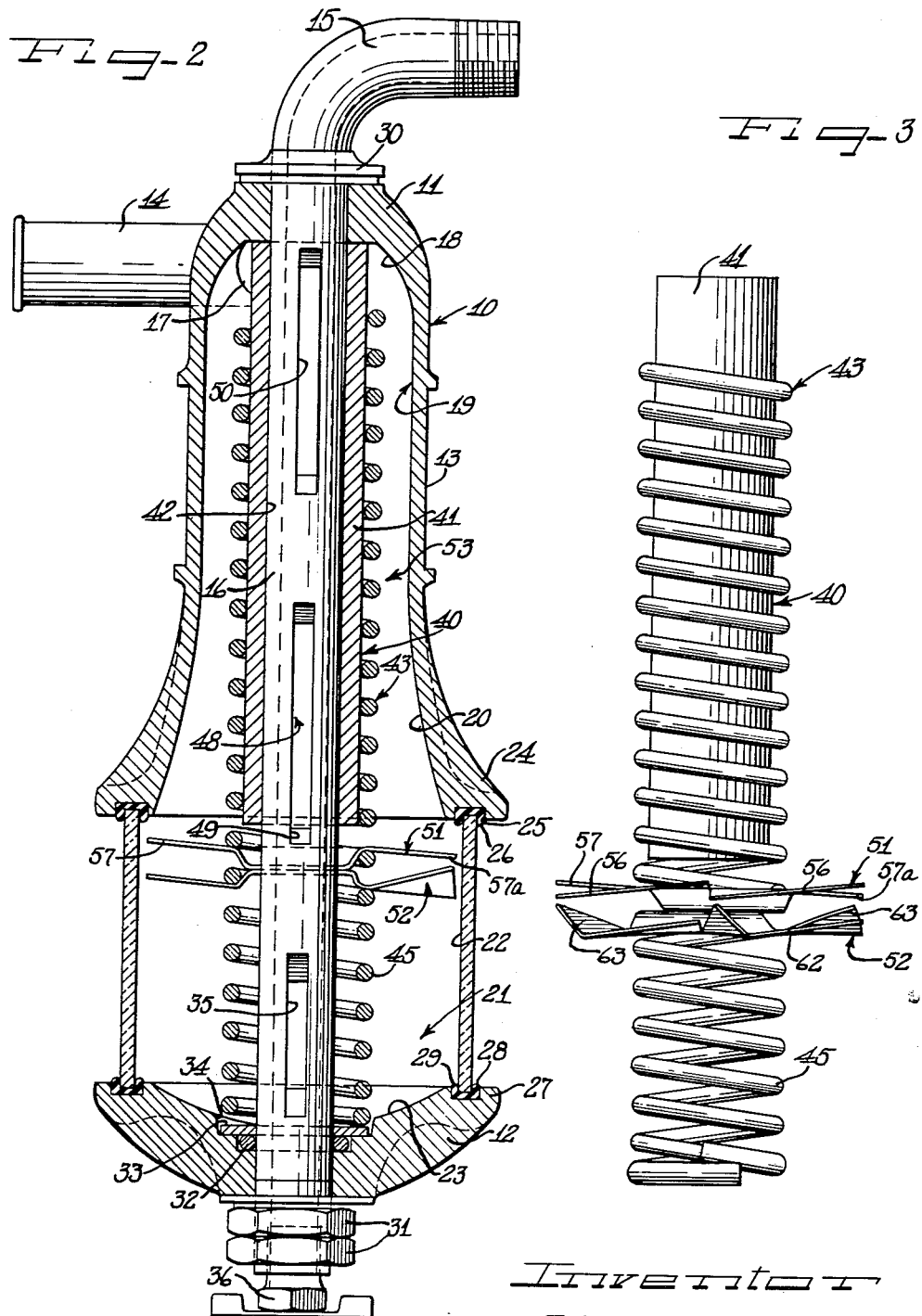
Inventor
Edgar M. Butler

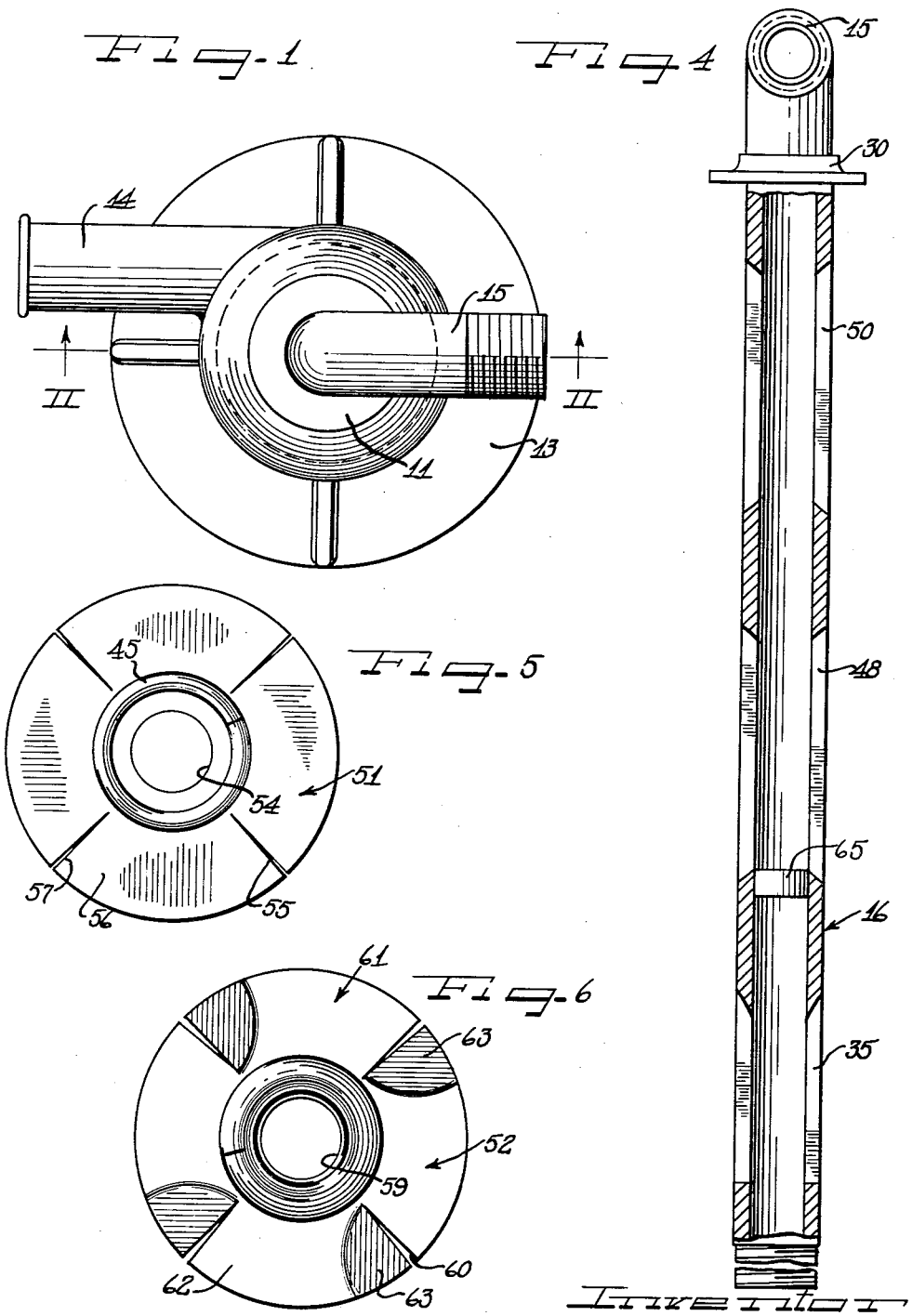

United States Patent Office 2,754,260

Patented July 10, 1956

2,754,260

ELECTROLYTIC WATER CORRECTION DEVICE

Edgar Millington Butler, New Orleans, La., assignor to Butler Engineering Company, Inc., New Orleans, La.

Application October 22, 1952, Serial No. 316,271

5 Claims. (Cl. 204—248)

The present invention relates to a self-energizing electrolytic water correction device and more particularly to such a device employed in conjunction with a centrifugal solids separator in which an aqueous electrolyte substantially free of suspended solids is recycled in contact with the device for electrolytic correction.

It has long been known that the use of "hard" water in circulatory water systems results in the formation of scale on various parts of the system. In recirculatory water systems, successive layers of scale are built up upon the heat exchange surfaces in contact with the water and upon the connecting piping of the system. This formation of scale may seriously interfere with the heat transfer efficiency of the system and also, in extreme cases, may actually impair the circulation of water through the system.

The present invention provides an electrolytic water correction device for employment in circulatory water systems, and especially for employment in recirculatory heat exchange systems, such as the cooling system for internal combustion engines, for the correction of water flowing through the system by the precipitation of scale-forming ingredients in the water as a soft sludge rather than as an adherent, hard scale. The device is employed in conjunction with a centrifugal-type solids separator for removing suspended solid matter from the aqueous electrolyte flowing through the system, the separation of solids being substantially accomplished prior to intimate contact between the aqueous electrolyte and the water correction device in order that efficient water correction is insured.

In this manner, it is possible to remove from the electrolyte loose particles of scale present in the electrolyte because of the partial dissolution of scale from the system and the flaking of non-dissolved scale upon such partial dissolution. Also, although the solid decomposition products of the correction device itself are essentially colloidal in nature and size and are not corrosive or erosive, these colloidal particles may grow to such size as to interfere with flow of electrolytes through the system, and these relatively large particles are removed from the system to prevent their clogging the system, while those decomposition products still in the colloidal state are allowed to circulate to afford continued water correction activity.

According to the principles of the present invention, an aqueous electrolyte containing suspended foreign matter flows in a spiral path downwardly through a hollow casing so that the suspended foreign matter is flung outwardly, under the influence of centrifugal force, for collection in a solids separation chamber. Following separation of the suspended solids, the substantially solids-free water is directed axially of the casing through an outlet for reentry into circulatory system in which the device of the present invention is employed.

A water correction device is positioned axially of the casing for contact with the relatively solids-free electrolyte present in the central portion of the casing during the downwardly spiral movement of the electrolyte therethrough. The water correction device is preferably axially bored to provide an axial outlet path for solids-free electrolyte, and the axial passage of the electrolyte from the casing is accomplished through the bore of the correction device. In this manner, contact of the electrolyte with the water correction device is increased and efficient water correction of substantially solids-free electrolyte is insured with the decomposition products of said anode being circulated through the system. Further, both the inner and the outer surfaces of the correction device are employed for electrolytic water correction, and the efficient utilization of the water correction device is made possible. In addition, it has been found that the decomposition products of the anodic element are capable of coagulating finely divided solids in the water to facilitate their removal by centrifugal action upon flow through the separator.

It is therefore, an important object of the present invention to provide an improved electrolytic water correction device for the correction of aqueous electrolytes.

Another important object of the present invention is to provide a combined electrolytic water correction device and solids separator for a circulatory water system in which substantially solids-free water is contacted with the correction device and then recycled through the device for further correction.

Still another important object of the present invention is to provide a centrifugal-type solids separator for fluid systems through which water containing suspended matter is circulated, the separator having an inlet opening and an outlet opening with an electrolytic water correction device interposed therebetween and with discharge from the separator taking place axially through the device to insure the electrolytic correction of substantially solids-free water.

It is a further important object of the present invention to provide a novel centrifugal type solids separator.

It is a still further important object of the present invention to provide a novel mounting for a water correction device.

It is another and further important object of the present invention to provide a novel replacement cartridge for a water correction device.

It is still another and further important object of the present invention to provide a novel outlet pipe for a water correction device.

It is another and still further important object of the invention to provide improved deflector plates for combined deflecting and skimming action between the settling basin and the water correction device of a solids separator and water correction unit.

It is yet another and further object of the invention to provide an improved deposit removal means for a solids separator and water correction unit.

Other and further important objects of this invention will be apparent from the disclosures in the specification and the accompanying drawings.

On the drawings:

Figure 1 is a top plan elevational view of an electrolytic water correction device and solids separator unit of the present invention;

Figure 2 is a sectional view, with parts shown in elevation, of the device taken along the plane II—II of Fig. 1;

Figure 3 is a side elevational view of a replacement cartridge according to the present invention;

Figure 4 is a longitudinal sectional view of an outlet tube according to the present invention;

Figure 5 is a top plan elevational view of the upper deflector plate according to the present invention; and Figure 6 is a bottom plan elevational view of the lower deflector plate according to the present invention.

As shown on the drawings:

In Fig. 1, reference numeral 10 refers generally to a combined electrolytic water correction device and solids separator of the present invention including an upper head 11, a lower head 12 spaced from the head 11, and a bell-shaped casing 13 integral with the upper head 11 and extending from the upper head toward the lower head.

The upper head 11 comprises a metal casing provided with a laterally directed inlet nipple 14 and an upper elbow-shaped outlet nipple 15. The outlet nipple 15 is exteriorly threaded for connection in a water circulatory system and is preferably formed integrally with a straight length of outlet pipe 16 which extends between the upper head 11 and the lower head 12 axially thereof.

The inlet nipple 14 communicates with an inlet passage 17 formed in the side wall of the head 11. It will be observed from Figs. 1 and 2 that the inlet nipple 14 extends generally tangentially to the curving interior wall 18 of the head 11. This internal wall 18 has a circular periphery of downwardly increasing diameter which merges into the interior generally cylindrical wall portion 19 of the casing 13. It will be seen that water flow through the inlet nipple 14 will be deflected by the curved interior wall 18 of the head into a downward spiralling path along the interior wall 19 of the casing 13. The flow of water continues to spiral downwardly toward and along the outwardly flaring interior wall portion 20 toward the lower end of the casing which also has a generally circular periphery. Here the rate of flow will be gradually diminished to allow solids to descend into the settling basin 21 defined by a second cylindrical casing 22 and the dished interior surface 23 of the head 12.

The second cylindrical casing 22 is preferably formed of glass or suitable transparent plastic material and is confined between the casing 13 and the head 12. The casing 13 terminates in an integrally formed, outturned peripheral flange 24 having an annular end face provided with an annular groove 25 in which is positioned an annular gasket 26 against which the upper edge of the second casing 22 is seated.

The lower head 12 is provided with an outer peripheral flange 27 having an annular groove 28 which is adapted to receive an annular gasket 29. The lower edge of the casing 22 is seated in this gasket 29. The heads 11 and 12 are secured together by means of the central outlet pipe 16, which has a collar 30 fixed at the upper end thereof for abutting the top of the upper head 11. The pipe 16 extends centrally through the upper head 11 and the lower head 12 and is threaded at its lower end externally to receive nuts 31. The central opening in the lower head 12 is sealed by means of a rubber ring 32 and a washer 33 mounted in a stepped recess 34 formed interiorly and centrally of the lower head 12.

The outlet pipe 16 is provided near its lower end with a pair of opposed longitudinal slots 35 opening into the lower part of the sediment basin 21, one end of the slot opening adjacent the dished interior surface 23 of the head 12. The lower end of the pipe 16 is interiorly threaded also to receive a closure plug 36 therein. The plug 36 is removed in order to blow out sediment from the casing 22.

A self-energizing electrolytic water correction device 40 is positioned on the outlet pipe 16. The device 40 comprises generally a cylindrical anodic core member 41 having an axial bore 42 for receiving therethrough the outlet pipe 16. The core is formed of an electronegative metal of the electromotive force series, preferably a metal above hydrogen in the electromotive force series of elements, such as zinc, magnesium or aluminum.

The electropositive element of the device 40 is provided by an outer helical coil spring 43 in intimate gripping engagement with the exterior cylindrical surface of the core 41 and preferably also by the outlet pipe 16 which is in engagement with the inner peripheral surfaces of the bore 42. The spring 43 and pipe 16 are formed of a relative electropositive metal of the electromotive force series of elements, preferably a metal below hydrogen in the electromotive force series, the spring being formed of metals such as silver, copper or silver or copper surfaced base metals, such as ferrous alloys, and the pipe being preferably formed of a ferrous metal.

The lower portion 45 of the outer spring 43 extends downwardly beyond the lower end of the core member 41 and serves to support the core member in the upper part of the solids separator of the water correction unit 10. The lower end of the spring is seated against the washer 33 in the central recess 34 of the head 12. The core members 41, therefore, preferably extends longitudinally and centrally of the casing 13 and head 11 with the upper end of the core member pressed by the free spring portion 45 into abutment with the interior wall of the upper head 11. The core member preferably terminates at its lower end just above the settling basin 21.

The outlet pipe 16 has a pair of opposed longitudinal slots 48 intermediate the length thereof, the lower portions of the slots opening just below the core member 41 as indicated at 49 in Fig. 2. The openings 49 thus provide an inlet into the interior of the outlet pipe 16. The intermediate slots 48 and additional slots 50 at the upper part of the pipe afford flow communication with the interior of the core member 41.

A pair of deflector plates 51 and 52 are threaded onto the free spring portion 45 and preferably welded thereto just below the core member 41. These plates tend to separate the sediment chamber 21 from the filtering chamber 53 defined by the head 11 and casing 13. As best seen in Fig. 5, the upper plate 51 has a central opening 54 for receiving the tube 16 therethrough, and has radial slits 55 therein dividing the plate into four blades 56. As best seen in Fig. 3, each blade 56 is preferably planar with its leading edge 57 axially offset upwardly from the trailing edge 57a of the adjacent blade. The leading edges 57 will thus tend to skim the circulating water passing over the plate.

The lower deflector plate 52 is best seen (from below) in Fig. 6 and is likewise provided with a central opening 59 for receiving the outlet tube 16. The lower deflector plate 52 likewise has radial slits 60 separating the plate into four blades 61. As best seen in Fig. 3, the main body part 62 of each blade extends generally parallel with the planar sloping blades 56 of the upper plate 51. However, the trailing tip portion of each blade turns sharply upward as indicated by the reference numeral 63, and provides a trailing edge spaced axially upwardly from the leading edge of the adjacent blade. The trailing tip 63 therefore has a flow retarding action on the circulating water between the two plates. The undersurfaces of the blades tend to retain water flowing under the bottom deflector plate within the settling basin.

As shown in Fig. 4, a rubber plug 65 is preferably inserted within tube 15 between slots 48 and 35 so as to prevent disturbance of the sediment chamber 21 by the flow of liquid discharging through the upper part of the tube.

The operation of the embodiment of the invention illustrated will now be described.

It will be seen from Fig. 2 that water, or other aqueous type liquids, entering the inlet passage 17 through the tangentially arranged nipple 14 will be deflected in a downward spiral by the internal wall 18 of the head 11. Of course, the downward flow of water will be aided by gravitational forces, so that water entering the inlet passage 17 flows in a generally spiral, downward path confined by the inner walls 19 of the casing 13. As the water travels through the casing in a spiral path, centrifugal forces acting upon any solid suspended with the fluid stream will throw the particles from the stream radially outwardly of the casing into the region of a relatively slowly traveling fluid film flowing down the inner surfaces of the casing 13 to carry the solid particles to the lower portion of the unit. This action is enhanced by the outwardly flaring interior wall 20 of the bell-shaped casing 13 which tends to reduce the rate of flow adjacent the periphery of the casing at the lower end. Thus, fluid flowing through the casing is forced to make a series of successive, short changes in direction with the stream being subjected to radial, tangential and gravitational forces during its course through the casing.

The solids thrown into the thin film of liquid adjacent the side walls, and moving slowly downwardly therealong due to fluid friction with the side walls and to the outwardly flaring configuration of the side walls 20, will be carried into the lower portion of the unit to settle within the region of the deflector plates or therebeneath. Following the passage of liquid through the casing to the position of the plates 51 and 52, the liquid impinging upon the plate 51 and still traveling in a spiral direction will flow over the plate and the blades 56 will skim unsettled foreign particles therefrom into the settling region 21 underlying the plates. The plates 52 serve to retard liquid flow and thus aid in the settling of foreign particles. Thus, the plates serve a triple function, i. e., to divide the casing into an upper centrifugal solids-separating region and into a lower settling region, to skim solid particles from the spirally traveling liquid for gravity sedimentation in the settling basin 21, and to retard flow to aid in the gravity sedimentation.

The only exit for fluid from the casing 13 is provided by the outlet pipe 16 and elbow 15. Therefore fluid flow in this direction will be established axially of the casing 13 with the solid particles falling into the settling region 21 between the plates and the inner surface of the lower head 12 for subsequent removal as desired by means of the blow-out plug 36 in the outlet pipe 16.

It will be seen that as the liquid follows its spiral course through the casing, only those portions of the liquid near the center of the casing will come in contact with the electrolytic water correction device 40 for reaction therewith. Thus, the water contacting the device 40 is relatively free of suspended foreign matter which has been removed centrifugally therefrom, thereby preventing unwarranted erosion of the negative element core 41 by any sharp solid particles.

In addition, the efficiency of water correction is enhanced by the presentation of relatively solids-free water to the electrolytic device to cause dissolution of hydrated negative metal ions therein as is well understood in the art. Water flowing through the casing 13 to the discharge passage 49 and through the outlet pipe 16 is also subjected to the corrective action of the correction device 40 as it flows through the pipe because of the longitudinal notches 48 and 50 communicating with the core 41. The walls of the notches in the pipe act as cathode in conjunction with the anodic core adjacent thereto. In this manner, the water is not only corrected during its initial course through the casing, but is also recycled into further contact with the device as the water flows from the casing. Finely divided solids dispersed in the water flowing through the separator are coagulated by the colloidal decomposition products of the anodic element of the galvanic couple 40, thus making removal of these particles possible by centrifugal action. The efficiency of the separator is thereby enhanced by the electrolytic dissolution of the anodes.

If the velocity of water flow through the device is so low as to prevent the spiral travel of water therethrough, the entire separator will serve as a settling tank to permit settling of solids from the water prior to removal of the water to the bore of the outlet pipe 16, again making possible efficient water correction.

If the second casing 22 is of transparent material, the condition of the settling chamber 21 can be judged by visual inspection.

It will thus be seen that the present invention provides a new and improved self-energizing electrolytic water correction device for employment in conjunction with aqueous electrolytes containing suspended foreign matter. The suspended matter is largely prevented by centrifugal action from being brought into contact with the electrolytic water correction device. After substantial separation of the solids from the water, the latter is then recycled through the bore of the device for further correction.

It should be observed that the center tube 16 performs a number of important functions in the device. Firstly the tube 16 provides the outlet for the device, and is arranged so that it can be rotated freely through 360° so as to adjust the position of the outlet nipple 15 relative to the inlet nipple 14. Secondly, the center tube 16 acts as the only member for holding the entire unit together so that the unit may be fastened simply by tightening nuts 31 on the lower end of the center tube. A further very important function of the center tube resides in the fact that the tube provides a rigid part that prevents the cartridge 41 from warping and bending during its disintegration as the anode in the galvanic couple.

It will be understood that modification and variations may be effected without departing from the scope of the novel concepts of the present invention.

I claim as my invention:

1. A combined solids separation and water correction unit comprising spaced first and second heads, a hollow casing confined between said first and second heads, an inlet passage in said first head for admitting water into said casing in a helical path defined by the interior surfaces of said casing with centrifugal forces developed in said water forcing said solid particles radially outwardly of the casing into contact with the casing side walls, an anodic core formed of an electronegative metal of the electromotive force series extending between said heads and having an axial bore, an outlet pipe extending through the bore of said anodic core and having passages in the side walls thereof communicating with said core, and of material of an electropositive metal of the electromotive force series, and discharge means in said first head for receiving water only from said outlet pipe, said outlet pipe having an opening remote from said discharge means affording communication between the exterior of said pipe and the interior of said pipe to admit water from the casing onto the interior of said pipe for flow past the interior of said core exposed by said passages in the side walls of the pipe and out said discharge means, whereby water passing through said casing and said outlet pipe is separated from suspended solid particles and electrolytically corrected.

2. A combined solids separation water correction unit comprising spaced first and second heads, a hollow casing confined between said first and second heads, an inlet passage in said first head for admitting water into said casing in a helical path defined by the interior surfaces of said casing with centrifugal forces developed in said water forcing said solid particles radially outwardly of the casing toward the casing side walls, an anodic core formed of an electronegative metal of the electromotive force series extending between said heads and having an axial bore, an outlet pipe extending entirely through said first and second heads and through said core for receiving water from said casing, said pipe having apertures through the wall thereof affording communication between the interior of said pipe and the interior surface of said core and having an opening more remote from the end of said pipe extending through said first head affording communication between the exterior of said pipe and the interior of said pipe to admit water from the casing into the interior of said pipe for flow past the interior surface of said core exposed by said apertures through the wall of the pipe and out the end of said pipe extending through said first head, means connected to said outlet pipe for holding the first and second heads and casing in assembled relation, a helical wire spring of an electropositive metal of the electromotive force series engaging the exterior surface of said anode, and spring means supporting said core on said outlet pipe against axial movement and bottoming adjacent said second head.

3. A combined solids separation and water correction unit comprising a first casing of bell shape having an inlet and an outlet opening at the top thereof, a second cylindrical casing in abutment with said first casing, a bottom head closing said second casing, an outlet pipe extending through the outlet opening at the top of the first casing and through the bottom head for holding the first and second casings in assembly, a hollow core member of electronegative metal of the electromotive force series surrounding said outlet pipe within the first casing, said outlet pipe having a lower opening within the second casing, an intermediate opening extending below said core member and a third upper opening of substantial extent establishing free flow communication between the interior of the hollow core member and the interior of the outlet pipe.

4. In combination in a water correction assembly, a casing having an interior chamber, means defining an inlet to said chamber, an outlet pipe of constant annular cross-section and formed of electropositive metal of the electromotive force series extending into said chamber through a wall of said casing and providing an outlet connection at the exterior of said casing, a hollow core of constant annular cross-section and formed of an electronegative metal of the electromotive force series encircling a portion of said outlet pipe in said chamber, means defining a water inlet path from said inlet and along the exterior surface of said core, means including said outlet pipe providing a counter current outlet path along the interior of said core to said outlet connection, and means formed of electropositive metal of the electromotive series cooperating with the exterior surface of said core to provide a galvanic couple for treating water flowing along said inlet path, said pipe having means spaced from said inlet along said inlet path and affording communication between said chamber and the interior of said pipe to connect said inlet and outlet paths, and said pipe having an opening of substantial cross-section relative to the thickness of said pipe through the wall thereof affording free-flow communication between the water flowing along said outlet path in said pipe and the interior surface of said core to provide a further galvanic couple for treating water flowing through said pipe.

5. In combination in a water correction assembly, a casing having an interior chamber, means defining an inlet to said chamber at one end thereof, an outlet pipe formed of electropositive metal of the electromotive force series extending into said chamber through a wall of said casing at said one end thereof and providing an outlet from said casing at said one end of said casing, a hollow core of electronegative metal of the electromotive force series in said chamber having a solid imperforate interior surface engaging a portion of said outlet pipe, means defining a water inlet path from said inlet and along the exterior surface of said core, means including said outlet pipe providing a countercurrent outlet path along the interior of said core to said outlet, a helical spring formed of electropositive metal of the electromotive force series in tightly gripping engagement with the outer surface of said core to provide a galvanic couple for treating water flowing along said inlet path, said pipe having means spaced from said inlet along said inlet path and affording communication between said chamber and the interior of said pipe to connect said inlet and outlet paths, and said pipe having an opening of substantial cross-section relative to the thickness of said pipe through the wall thereof affording free-flow communication between the water flowing along said outlet path in said pipe and the interior surface of said core to provide a further galvanic couple for treating water flowing through said pipe.

References Cited in the file of this patent

UNITED STATES PATENTS

| | | |
|---|---|---|
| 685,176 | Ross | Oct. 22, 1901 |
| 856,361 | Neiburg | June 11, 1907 |
| 952,620 | Keyes | Mar. 22, 1910 |
| 1,400,622 | Nordell | Dec. 20, 1921 |
| 1,751,689 | Enz | Mar. 25, 1930 |
| 2,334,790 | Roffy | Nov. 23, 1943 |
| 2,358,981 | Lattner | Sept. 26, 1944 |
| 2,451,067 | Butler | Oct. 12, 1948 |
| 2,607,725 | Butler | Aug. 19, 1952 |
| 2,652,358 | McFerran | Sept. 15, 1953 |
| 2,687,996 | Butler | Aug. 31, 1954 |